United States Patent Office 3,138,189
Patented June 23, 1964

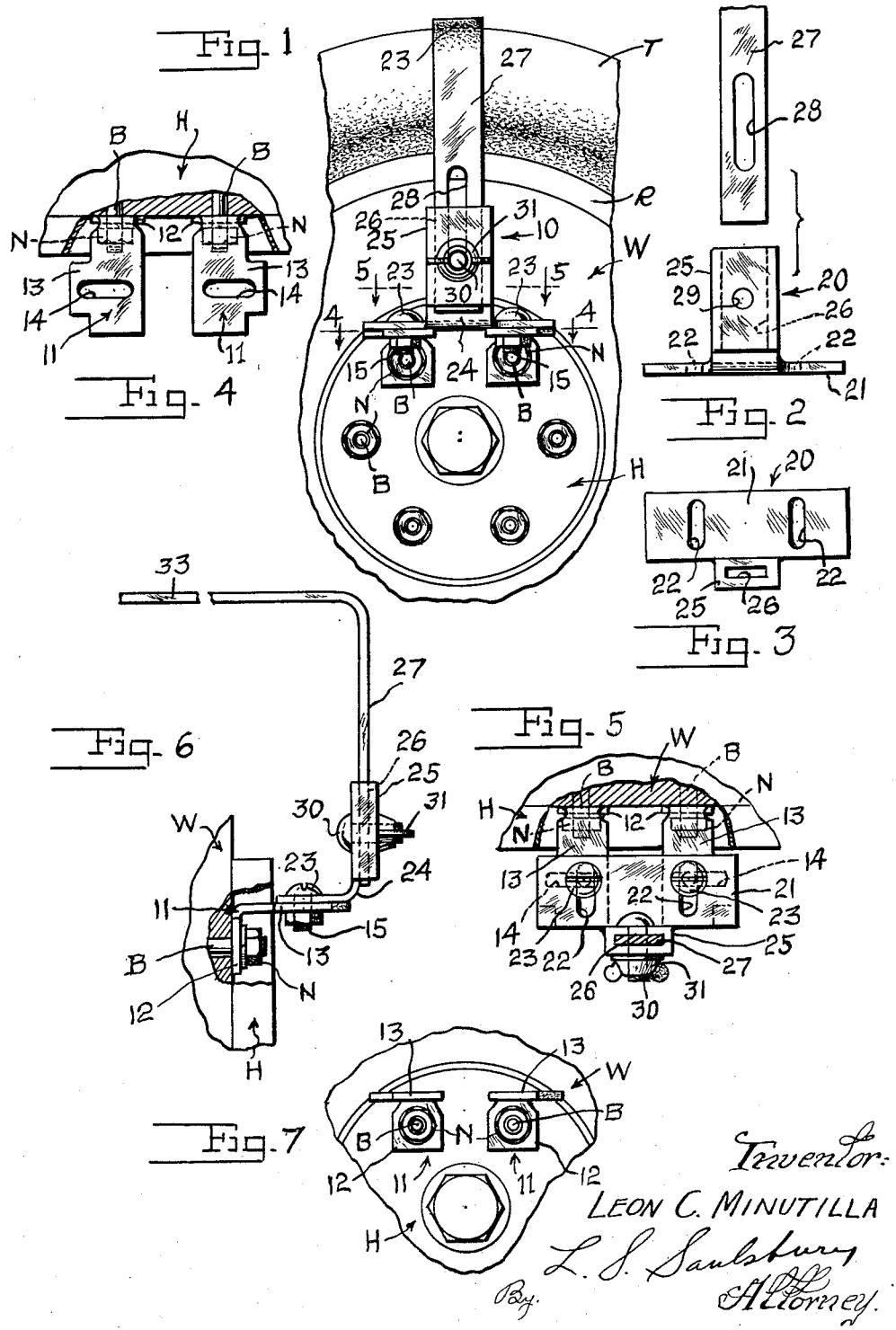

3,138,189
TRACTION GRIP DEVICE FOR VEHICLE TIRES
Leon C. Minutilla, New York, N.Y., assignor to Rhode Island Spring Products, Inc., East Providence, R.I., a corporation of Rhode Island
Filed Dec. 12, 1962, Ser. No. 244,185
1 Claim. (Cl. 152—216)

This invention relates to a traction grip device for vehicle tires, and has as its primary object the provision of an improved device for enhancing the tractive effect of a vehicle in mud, snow, ice or similar unfavorable conditions.

An additional important object of the invention is the provision of a device of this character provided with means whereby a traction arm extending over the rim of a vehicle tire is yieldably mounted, so that upon the loss of pressure in the vehicle tire, such as might be occasioned by a flat tire, or by the normal weight of the vehicle when the device is at the bottom of the wheel, the arm supporting the traction device will yield, rather than break, as has hitherto been the case in inflexible devices of this character.

A further object of the invention is the provision of a device of this character which may be mounted on the wheel mounting bolts in such manner as firmly to secure the same to the wheel.

An additional object of the invention is the provision of means whereby the mounting may be adjusted to accommodate different types and sizes of vehicle wheels.

A still further object of the invention is the provision of a device of this character which is sturdy and durable in construction, reliable and efficient in operation, and relatively simple and inexpensive to manufacture, install and utilize.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is a side elevational view of one form of device constructed in accordance with this invention shown as applied to a vehicle wheel and tire, the latter being partially broken away.

FIG. 2 is an exploded rear elevational view of one of the components of the device as shown in FIG. 1.

FIG. 3 is a top plan view of one of the elements of FIG. 2.

FIG. 4 is a sectional view taken substantially along the line 4—4 of FIG. 1 with certain components removed.

FIG. 5 is a sectional view taken substantially along the line 5—5 of FIG. 1 as viewed in the direction indicated by the arrows.

FIG. 6 is a side elevational view of the structure of FIG. 1, parts thereof being broken away for clarity of illustration, and, FIG. 7 is a fragmentary view showing the initial mounting of portions of the device on the wheel hub.

Similar reference characters refer to similar parts throughout the several views of the drawing.

Having reference now to the drawing in detail, there is generally indicated at 10 a device constructed in accordance with the instant invention which is adapted to be mounted on two adjacent mounting bolts B on the hub H of a vehicle wheel W provided with a tire T. The device of the instant invention comprises a pair of oppositely disposed L-shaped lugs generally indicated at 11, each of which includes a vertical arm 12 and a horizontal arm 13. The vertical arm 12 is provided with a central aperture which is adapted to engage over the end of the mounting bolt B and be secured thereon by the usual nuts N. Each horizontal flange 13 has a transversely extending slot 14 therein through which extends the shank 15 of a securing bolt. The shanks 15 may be moved linearly in the slots 14, thus providing an effective spacing in accordance with the spacing of the bolts B.

A second L-shaped member generally indicated at 20 includes a horizontal flange 21 having a pair of spaced parallel slots 22 therein which extend at right angles to the slots 14, and which are adapted to be penetrated by the shanks 15, the heads 23 of the bolts seating on the outer or upper side of flange 21. The arrangement is thus such that the flange 21 may be moved inwardly or outwardly relative to the face of the wheel to accommodate the varying offset relationship of the rims R of various types of wheels to the bolts B in the hubs H. An up-right portion 24 of member 20 is provided with a sleeve 25 having a central slotted aperture 26 therein through which extends an arm 27 having a longitudinal slot 28 therein. An opening 29 through sleeve 25 intersecting slotted aperture 26 accommodates a bolt 30 which is secured in position by a wing nut 31. The bolt 30 also extends through the slot 28 and permits limited linear movement of the arm 27. At its outer extremity the arm 27 is provided with a transverse traction member 33 which extends across the periphery of the tire rim, and provides additional tractive effect. The arrangement is such that no clamping action is afforded by wing nut 31, so that the arm 27 may slide freely within the slot 26 of sleeve 25 in accordance with the over-all diameter of tire T. Thus, when the tire is compressed due to the weight of the vehicle at the under side of its path of travel, the arm 27 is afforded a limited movement within the slotted opening 26, and if the tire becomes entirely flat, movement is permitted up to the limits afforded by the slot 28. The arrangement is thus such that even if the tire goes entirely flat the arm 27 and its associated traction piece 33 is not damaged, and the device may be effectively re-employed after repair of the tire.

While in the illustrative embodiment of the invention herein shown there is disclosed only one arm, it is to be understood that two, three or more arms 27 may be employed at suitable spaced intervals about the periphery of the hub H as may be necessary or desirable. It will also be seen that limited movement is afforded in a direction tangential to the hub of the mounting member so that various types of wheel hubs may be accommodated, and that limited movement toward and away from the wheel is also permitted by the slots 22, so as to accommodate various overhangs of rims R or tires T.

From the foregoing it will now be seen that there is herein provided an improved traction device for vehicles, which accomplishes all of the objects of this invention, and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In combination with a vehicle wheel having a disc body, spaced mounting bolts for the disc body, a rim around the body, a pneumatic tire on the rim, a traction device removably mounted on the bolts, said device including a pair of L-shaped lugs secured to said bolts closely spaced from each other, one arm of said lugs extending axially of the disc body, said axial arm having a slit therein, an L-shaped device mounted on said axial arms, said latter device including an axial leg with spaced transverse closed slots therein intersecting the slots in the axial arms, bolts in said intersecting slots, a radial leg having a central slotted aperture therein, a sleeve around said last-named radial leg, said sleeve having a hole therein intersecting the slotted aperture in the radial leg, and a flat angular traction piece having one leg slidable in the sleeve and having its other leg extending across the periphery of the tire, said slidable leg having an elongated closed slot, a bolt extending through the intersecting hole and slot, and a wing nut on the protruding end of the bolt engaging said sleeve, said slidable leg slidable inwardly and outwardly on the shank of said last-named bolt.

References Cited in the file of this patent
UNITED STATES PATENTS

| | | |
|---|---|---|
| 2,440,576 | De Haas | Apr. 27, 1948 |
| 3,055,411 | Mont | Sept. 25, 1962 |

FOREIGN PATENTS

| | | |
|---|---|---|
| 813,291 | France | Feb. 22, 1937 |